July 11, 1939.   M. H. RYAN   2,165,656
CONNECTOR
Filed Sept. 15, 1938
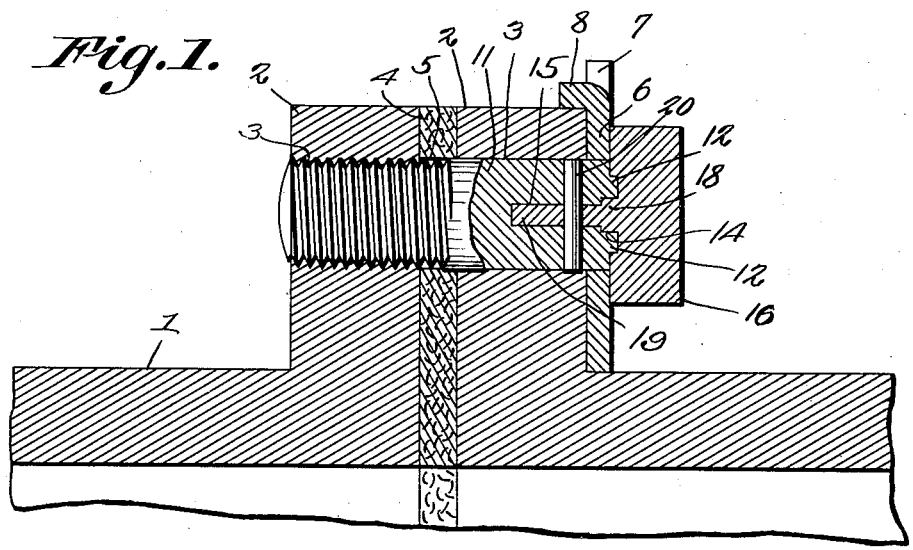
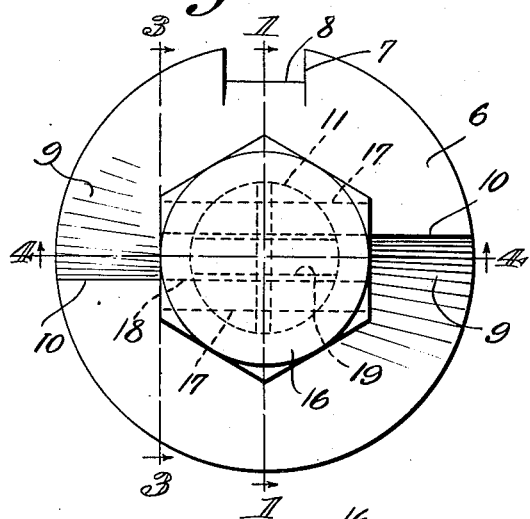
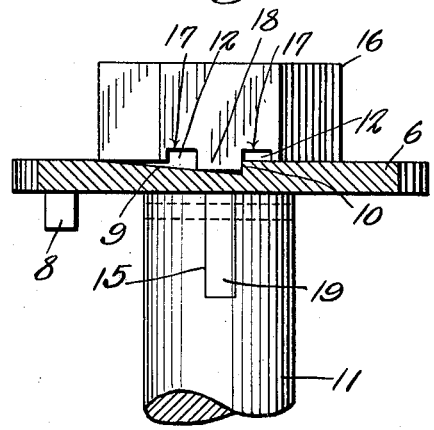
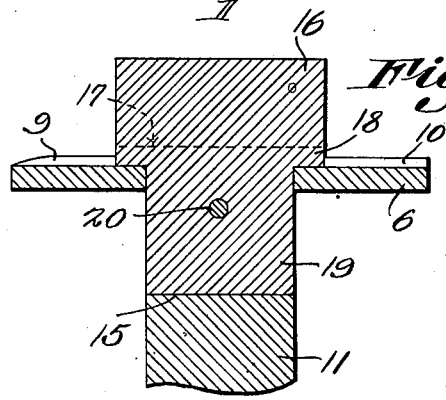
M. H. Ryan
INVENTOR.
BY C. A. Snow & Co.
ATTORNEYS.

Patented July 11, 1939

2,165,656

UNITED STATES PATENT OFFICE 2,165,656

CONNECTOR

Michael H. Ryan, Los Angeles, Calif.

Application September 15, 1938, Serial No. 230,128

2 Claims. (Cl. 85—1)

It is a well known fact that train pipes, for instance, steam conduits, are severed when a train breaks apart, the replacement of broken members calling for much work and considerable expense. The present invention aims to provide novel means whereby train conduits may be joined together simply, a reunion in the event of breakage, being brought about readily.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawing:

Fig. 1 shows in section, a device constructed in accordance with the invention and applied to a train conduit, Fig. 1 being a section on the line 1—1 of Fig. 2;

Fig. 2 is an end elevation of the connector per se;

Fig. 3 is a section on the line 3—3 of Fig. 2;

Fig. 4 is a section on the line 4—4 of Fig. 2.

The train pipe sections to be joined, may be constructed in different ways, and the showing of Fig. 1 need not be adhered to, as to the construction of the train pipe sections, the drawing being diagrammatic in that respect. The train pipe sections are marked by the numeral 1 and have outstanding flanges 2, provided with alined openings 3. The numeral 4 marks a packing of a resilient nature, which may be interposed between the flanges 2, the packing 4 having openings 5 alined with the openings 3 of the flanges 2.

Against one of the flanges 2 is placed a lock washer 6, supplied in its edge with a notch 7. The material freed in the formation of the notch 7 is turned at right angles to the washer 6, to form a holding finger 8, which, engaging the edge of one of the flanges 2, holds the washer 6 against turning. On its outer surface, the lock washer 6 is provided with oppositely disposed surfaces 9, inclined to form shoulders 10.

The numeral 11 marks the shank of a connector, such as a bolt. On its outer end, the shank 11 of the connector has parallel outstanding ribs 12, between which exists a space 14, communicating with a slot 15 in the shank 11.

The head 16 of the connector is adapted to receive a wrench, and is provided on its inner surface with parallel grooves 17, defining between them a rigid pawl 18. The pawl 18 is provided with a reduced tongue 19.

The tongue 19 is received in the slot 15 of the shank 11. The ribs 12 of the shank 11 are received in the grooves 17 of the head 16. The pawl 18 of the head 16 is received in the space 14 of the shank 11. Through the shank 11 and through the tongue 19 is inserted a frangible element, such as a shear pin 20, the shear pin being fixed in the shank 11 and being housed within one of the flanges 2, as shown in Fig. 1, the shank 11 passing through the openings 3 of the flanges 2, the shank being threaded into one of the flanges 2.

The operation of the device is simple. When the connector is turned by means of the head 16, the pawl 18, coacting with the shoulders 10, prevents retrograde rotation of the connector with respect to the lock washer 6, and the lock washer cannot turn, because the finger 8 engages one of the flanges 2, as shown in Fig. 1. In the event that the train conduit breaks, the shear pin 20 will give away, and there will be no breakage of costly parts. When the head 16 of the connector is freed by the breaking of the shear pin 20, a wrench may be applied to the parallel outer surfaces of the ribs 12 of the shank 11, to thread the shank out of the opening in the flange 2 remote from the connector head 16.

Having thus described the invention, what is claimed is:

1. In a connection for train pipes and the like, a bolt comprising a threaded shank provided on one end with transverse outstanding ribs, defining a space therebetween, a turning head provided on its inner surface with transverse grooves and with an outstanding rib therebetween, the intermediate portion of the rib of the head being received in said space of the shank, the end portions of the rib of the head forming pawls shaped for cooperation with means for holding the bolt against rotation, the grooves of the head receiving the ribs of the shank, and a shear member forming a releasable connection between the head and the shank, the outstanding ribs of the shank affording a wrench hold, whereby the shank may be threaded out, when the head is detached, due to a failure of the shear member.

2. In a connection for train pipes and the like, a bolt comprising a threaded shank, a turning head, and a shear member joining the head to the shank, one end of the shank and the inner surface of the head being provided with detachably interengaged transverse parts, said parts of the shank outstanding with respect to said end of the shank and being so shaped as to afford a wrench hold whereby the shank may be threaded out, when the head is detached, due to a failure of the shear member.

MICHAEL H. RYAN.